United States Patent
Adiletta et al.

(10) Patent No.: US 6,304,604 B1
(45) Date of Patent: Oct. 16, 2001

(54) METHOD AND APPARATUS FOR CONFIGURING COMPRESSED DATA COEFFICIENTS TO MINIMIZE TRANSPOSE OPERATIONS

(75) Inventors: Matthew Adiletta, Worcester, MA (US); Robert Stepanian, San Francisco; Teresa Meng, Portola Valley, both of CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/220,912

(22) Filed: Dec. 24, 1998

(51) Int. Cl.[7] ............................................. H04B 1/66
(52) U.S. Cl. ............................................. 375/240.18
(58) Field of Search ............................. 348/390.1, 384.1, 348/395.1, 387.1, 400.1, 403.1; 375/240.01, 240.03, 240.18, 240.2; 382/232, 234, 236, 240, 248, 250; 708/400, 401, 402, 406; H04B 1/66

(56) References Cited

U.S. PATENT DOCUMENTS

| | | | |
|---|---|---|---|
| 5,216,516 | * 6/1993 | Tanaka et al. | 358/426 |
| 5,291,282 | * 3/1994 | Nakagawa et al. | 348/384 |
| 5,371,611 | * 12/1994 | Katto et al. | 348/458 |
| 5,384,644 | * 1/1995 | Yamagami | 348/384 |
| 5,621,466 | * 4/1997 | Miyane et al. | 348/405 |
| 5,745,251 | * 4/1998 | Yamagami | 348/384 |
| 5,801,776 | * 9/1998 | Tamura et al. | 348/403.1 |
| 5,872,874 | * 2/1999 | Natarajan | 382/298 |
| 5,923,787 | * 7/1999 | Hara et al. | 382/251 |
| 6,011,498 | * 1/2000 | Witting | 341/67 |
| 6,097,846 | * 8/2000 | Abe | 382/250 |

OTHER PUBLICATIONS

Shen–Fu Hsiao et al., A Cost–efficient and Fully–pipelineable architecture for DCT/IDCT, Consumer Electronics, 1999. ICCE. International Conference on, 1999, pp. 60–61.*

Hsaio et al., Design and Implementation of a novel linear–array DCT/IDCT processor complexity of order lage/sub/2/N, Vision, Image and Signal Processing, IEE Proceedings, vol. 147 Issue 5, 2000, pp. 400–408.*

* cited by examiner

*Primary Examiner*—Chris Kelley
*Assistant Examiner*—Tung Vo
(74) *Attorney, Agent, or Firm*—Hamilton, Brook, Smith & Reynolds, P.C.

(57) ABSTRACT

A method for decompressing compressed data elements, drawing that decompression operation, the intermediate coefficients are organized in a matrix configuration such that the number of transpose operations are minimized. The organization of that matrix includes storing sequential coefficients, translated from the compressed data, in sequential locations of sequential columns of the matrix. The transpose operation is performed during the inverse discrete cosine operation portion of the decompression operation.

24 Claims, 6 Drawing Sheets

METHOD AND APPARATUS FOR CONFIGURING COMPRESSED DATA COEFFICIENTS TO MINIMIZE TRANSPOSE OPERATIONS

BACKGROUND OF THE INVENTION

This invention relates generally to computer systems and more specifically to efficient data transmission between MPEG video compression stages.

Decompression and compression of video and audio data is used for video playback and for teleconferencing applications. Video playback and teleconferencing applications require compression methods that are capable of reducing video frame data to the smallest number of bits that can accurately represent the original signal. The main reasons for this are to enable real-time transmission of the compressed files across integrated services data networks (ISDN) lines and across standard telephone (POT) lines, and to reduce the required amount of data storage space.

There are many types of video compression and decompression techniques provided in the art. Seven of these techniques include the MPEG, MPEG-2 and MPEG-4 standards developed by the Moving Pictures Experts Group, the IPEG standard, the JPEG standard developed by the Joint Picture Experts Group, the Px64 standards, and the H.26x video teleconferencing standards. Each standard uses a variety of encoding methods for encoding frames of sound and video data. For example, the MPEG standards use a combination of Huffman run-level encoding, quantization, discrete cosine transfer (DCT), and motion compensation to compress, or encode, sound and video data Regardless of the standard that is used, the procedures used to compress a file are simply reversed to uncompress, or decode, that file.

The MPEG procedures used during decompression of compressed data would be performed in a pipeline manner as follows. First, a compressed data file is accessed by the system that is to perform the decompression. The compressed file is comprised of variable length codes, referred to as Huffman run-level codes, which represent patterns of logical ones and zeroes. The Huffman run-level codes enable those patterns to be represented in a manner that occupies a significantly smaller amount of memory than the patterns otherwise would. For example, the shortest Huffman run-level codes represent patterns of logical ones and zeroes that are most frequently encountered. Likewise, the longest Huffman run-level codes represent patterns of logical ones and zeroes that are least frequently encountered. Accordingly, the most frequently encountered patterns are replaced with the shortest Huffman run-level codes, thereby producing a significant reduction in storage space.

When the system accesses a compressed file, it is parsed to extract the Huffman run-level codes. The Huffman run-level codes are then reconverted into the patterns of logical ones and zeroes that they represent. Those patterns will be referred to as coefficients. Typically the coefficients are arranged in groups of sixty four, and further arranged in eight-by-eight matrices organized in the order in which they are translated from the run-level codes. Such a matrix is comprised of storage locations in a memory storage unit. Those storage locations are logically arranged in a row and column configuration and are accessed with respect to their relative position with the matrix.

It should be noted that although eight-by-eight matrices of coefficients are typically used in the art, four-by-four matrices will be used for simplicity of illustration. One of ordinary skill in the art will be able to scale the illustrations appropriately to the eight-by-eight implementation.

For illustration purposes, consider a group of sixteen coefficients ($C_n$), each having eight bits of data. The coefficients are arranged in the following four-by-four coefficient matrix where $C_1$ is the first coefficient translated:

$$\begin{vmatrix} C1 & C2 & C3 & C4 \\ C5 & C6 & C7 & C8 \\ C9 & C10 & C11 & C12 \\ C13 & C14 & C15 & C16 \end{vmatrix}$$

The second stage of the decompression pipeline is the inverse quantization stage wherein an element-wise multiplication is performed. The element-wise multiplication multiplies each of the coefficients in the four-by-four matrix by corresponding quantization factors ($Qf_n$) stored in a quantization matrix. The quantization matrix is the same size as the coefficient matrix, in this case 4×4. The multiplication is performed as follows:

$$\begin{vmatrix} C1 & C2 & C3 & C4 \\ C5 & C6 & C7 & C8 \\ C9 & C10 & C11 & C12 \\ C13 & C14 & C15 & C16 \end{vmatrix} \times \begin{vmatrix} QF1 & QF2 & QF3 & QF4 \\ QF5 & QF6 & QF7 & QF8 \\ QF9 & QF10 & QF11 & QF12 \\ QF13 & QF14 & QF15 & QF16 \end{vmatrix} =$$

$$\begin{vmatrix} Q1 & Q2 & Q3 & Q4 \\ Q5 & Q6 & Q7 & Q8 \\ Q9 & Q10 & Q11 & Q12 \\ Q13 & Q14 & Q15 & Q16 \end{vmatrix}$$

For example, Q1 is the product of coefficient C1 and quantization factor QF1. Therefore inverse quantization operation scales each coefficient by the associated quantization factor. In this manner, coefficients can be stored using a smaller representative number of bits and, upon inverse quantization, the coefficients are returned to their original representation.

Upon completion of the inverse quantization operation, the coefficients are each represented by a sixteen bit word The resulting sixteen-bit coefficients are packed into eight longwords (32 bit words) in the following arrangement:

$$\begin{vmatrix} Q1 & Q2 \\ Q3 & Q4 \\ Q5 & Q6 \\ Q7 & Q8 \\ Q9 & Q10 \\ Q11 & Q12 \\ Q13 & Q14 \\ Q15 & Q16 \end{vmatrix}$$

The coefficients in the above mentioned matrix are input to the third stage of the decompression pipeline, referred to as the inverse discrete cosine transfer stage. When the files are compressed, a discrete cosine function is applied to each eight-by-eight block of coefficients using the following equation:

$$F(u, v) = \frac{1}{4} C(u) C(v) \sum_{x=0}^{7} \sum_{y=0}^{7} f(x, y) \times \cos\left[\frac{(2x+1)\mu\pi}{16}\right] \cos\left[\frac{(2y+1)v\pi}{16}\right]$$

To reverse the effects of the discrete cosine transfer an inverse discrete cosine function is performed, thereby restoring the original data. The inverse cosine function is applied using the following equation:

$$f(u, v) = \frac{1}{4}\sum_{x=0}^{7}\sum_{y=0}^{7} C(u)C(v)F(u, v) \times \cos\left[\frac{(2x+1)u\pi}{16}\right]\cos\left[\frac{(2y+1)v\pi}{16}\right]$$

Because the two-dimensional discrete cosine transfer is an orthogonal function with orthonormal basis vectors, it can be performed as a series of one-dimensional row transforms followed by a series of one-dimensional column transforms. Accordingly, the inverse discrete cosine transform operation is also performed in two one-dimnensional portions, i.e. a series of row transforms followed by a series of column transforms. The row operation portion is typically performed first. The sixteen-bit data in the matrix of the inverse quantization stage is re-ordered in the following manner and input to the inverse discrete cosine transform row operation:

$$\begin{vmatrix} Q1 & Q2 & Q3 & Q4 \\ Q5 & Q6 & Q7 & Q8 \\ Q9 & Q10 & Q11 & Q12 \\ Q13 & Q14 & Q15 & Q16 \end{vmatrix}$$

Because each of the elements typically include sixteen bits of data, each row of the matrix represents two longwords. The coefficients are output from the inverse quantization stage in the same order that the row transform operation requires. Therefore the individual words are not re-ordered but are simply packed into the two-longword pairs.

Conversely, the column operation portion of the inverse discrete cosine transfer requires a significantly different configuration of coefficients from that which is required for the row operation portion. Specifically, the rows and columns of the matrix used in the row operations need to be exchanged, or transposed. Typically a transpose operation is required to arrange the coefficients output from the inverse quantization stage into the following order:

$$\begin{vmatrix} Q1 & Q5 & Q9 & Q13 \\ Q2 & Q6 & Q10 & Q14 \\ Q3 & Q7 & Q11 & Q15 \\ Q4 & Q8 & Q12 & Q16 \end{vmatrix}$$

The transpose operation is performed by copying the coefficients into general purpose registers and then reordering them.

After the inverse discrete transform operation is complete, the resulting error coefficients ($E_n$) remains in the same order as the data input to the column operation. Accordingly, the resulting data is not ordered in raster order, i.e., the order in which the data is arranged on an output display. Therefore the rows and columns of the matrix are again transposed before the error data is input to the next stage in the decompression pipeline, i.e., the motion compensation stage. After the rows and columns are transposed, the resulting error coefficients are arranged as follows:

$$\begin{vmatrix} E1 & E2 & E3 & E4 \\ E5 & E6 & E7 & E8 \\ E9 & E10 & E11 & E12 \\ E13 & E14 & E15 & E16 \end{vmatrix}$$

The motion compensation stage adds the error coefficients to an associated motion vector, generated by a motion estimation stage, to produce actual pixel data. The motion estimation stage of the decompression pipeline compares the value of each pixel in the matrix to the value of each surrounding pixel in a consecutive frame. Based on those values, the operation determines which direction the pixels are moving and then determines a local gradient, i.e. the direction of greatest change. The local gradient is represented as a vector ($m_{13}X$, $m_{13}Y$) which, when added to a pixel's position in the prior frame, gives that pixel's position in the current frame. That vector adding computation is referred to as motion compensation and requires the pixel data to be in raster order. The data should also be in raster order so that the uncompressed pixel data can easily be displayed on an output device as it is output from the decompression pipeline. When data is arranged in raster order it is arranged in the order that it is to be displayed on the output device. Accordingly the pixel that is to be displayed at the top left corner of the output device is the first pixel in the matrix. The other pixels in the matrix are those which follow from left to right and from top to bottom, with respect to the output display device.

Such transpose operations are performed thousands of times for each frame of data that is decompressed which increases the duration of a decompression operation. Accordingly it is desirable to minimize or eliminate the transpose operations. Further, in order to decompress and display video and audio data in a real time manner, the data must be communicated through the operational stages in a manner which is highly efficient. The current manner of using transpose operations does not lend itself to such an efficient operation.

SUMMARY OF THE INVENTION

In accordance with the present invention, a method and apparatus for ordering matrices of coefficients is disclosed such that the number of transpose operations of a decompression operation are minimized. More specifically, the present invention resides in a method for decompressing compressed data elements. During that decompression operation, the intermediate coefficients are organized in a matrix configuration such that the number of transpose operations are minimized. The transpose operation is performed during the inverse discrete cosine operation portion of the decompression operation, which receives a significant performance gain due to the present invention. Further, the organization of the matrix includes storing sequential coefficients, translated from the compressed data, in sequential locations of sequential columns of the matrix.

BRIEF DESCRIPTION OF THE DRAWINGS

The foregoing features of this invention, as well as the invention itself, may be more fully understood from the following detailed description when read in conjunction with the accompanying drawings, in which.

DETAILED DESCRIPTION OF A PREFERRED EMBODIMENT

Figure 1:
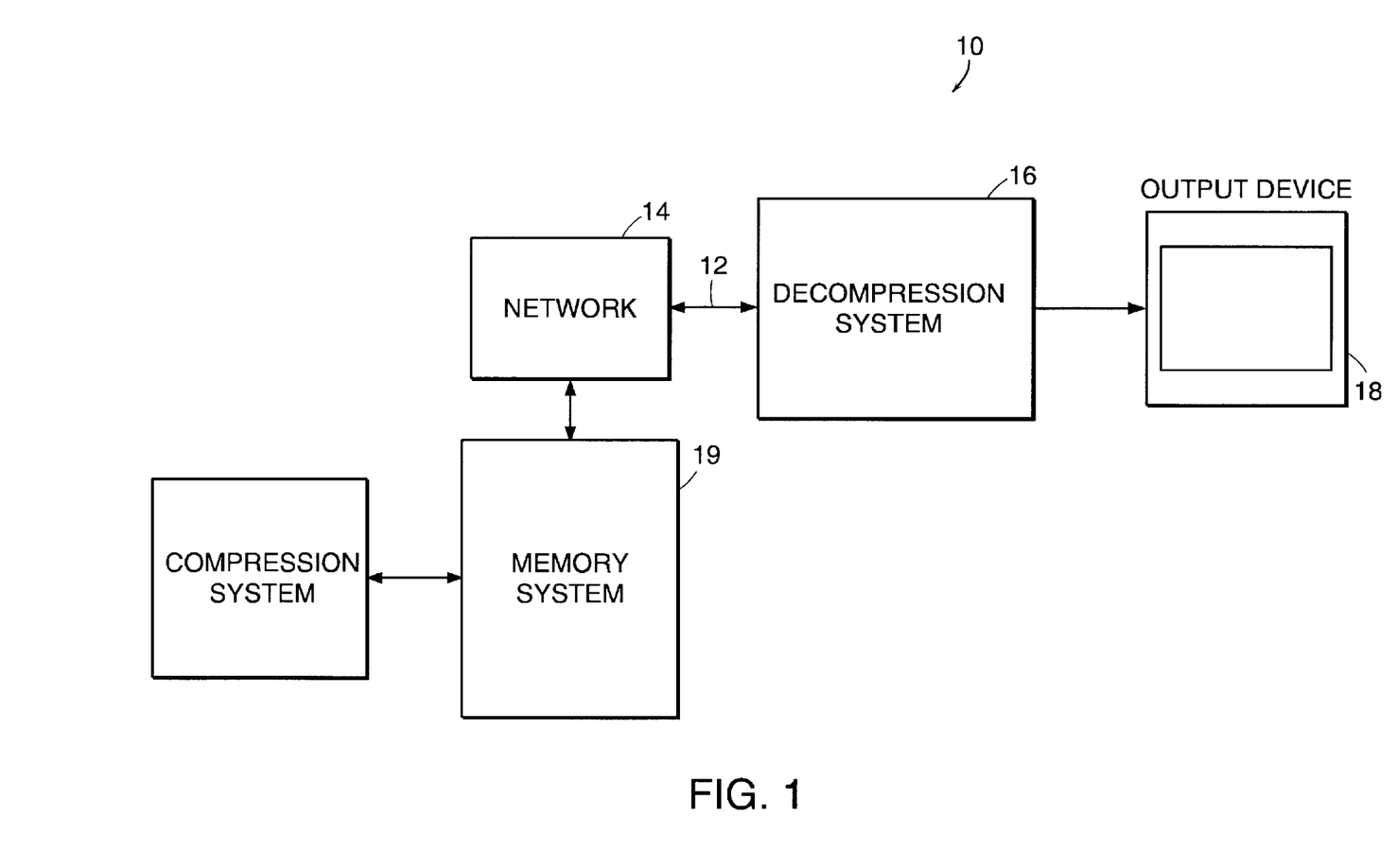
FIG. 1 illustrates a block diagram of a computer system used for decompressing compressed video and data files in accordance with the present invention.

Referring to FIG. 1, a block diagram of a computer system 10, used for decompressing compressed video and data files, is shown. The system 10 includes a cable 12 coupled to an electrical network 14, such as a broadcast cable or a computer network. The system 10 also includes a decompression system 16 that receives compressed video files from that cable 12 and is connected to an output device 18 for displaying the decompressed data.

Compressed video files are typically stored in a memory system 19 that is remote from the decompression system 16. In some applications, such as teleconferencing applications, the files are stored briefly at the remote memory system and then transferred to the decompression system 16 via the network 14 and cable 12.

The Decompression Pipeline

Figure 2:
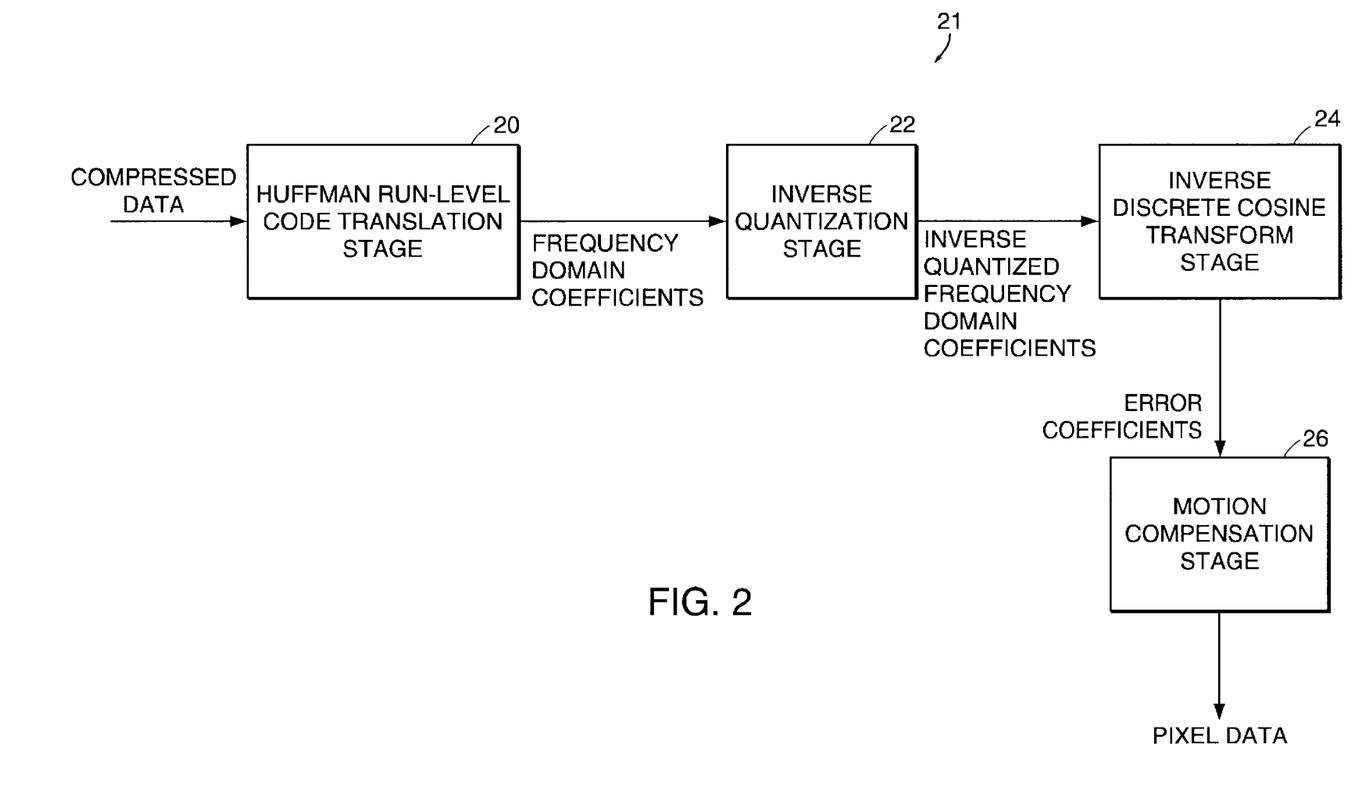
FIG. 2 depicts a detailed block diagram of the decompression pipeline contained in the computer system of FIG. 1, utilizing the present invention.

Referring to FIG. 2, a decompression pipeline 21 that executes on the decompression system 16 and that includes the present invention is shown to include several stages through which compressed data is passed. The stages include the Huffman run-level code translation stage 20, the inverse quantization stage 22, the inverse discrete cosine transform stage 24 and the motion compensation stage 26. In prior art system, transpose operations are executed during the inverse discrete cosine stage 24 and before the motion compensation stage 26. A transpose operation involves exchanging the rows and columns of a matrix containing data being operated on, referred to as a coefficient matrix. An embodiment of the present invention allows the decompression pipeline 21 to be executed using a minimal number of transpose operations. Minimizing the number of transpose operations increases the performance of the decompression system because such transpose operations are performed many times during decompression of every frame of video data.

Coeffient Ordering

Figure 3:
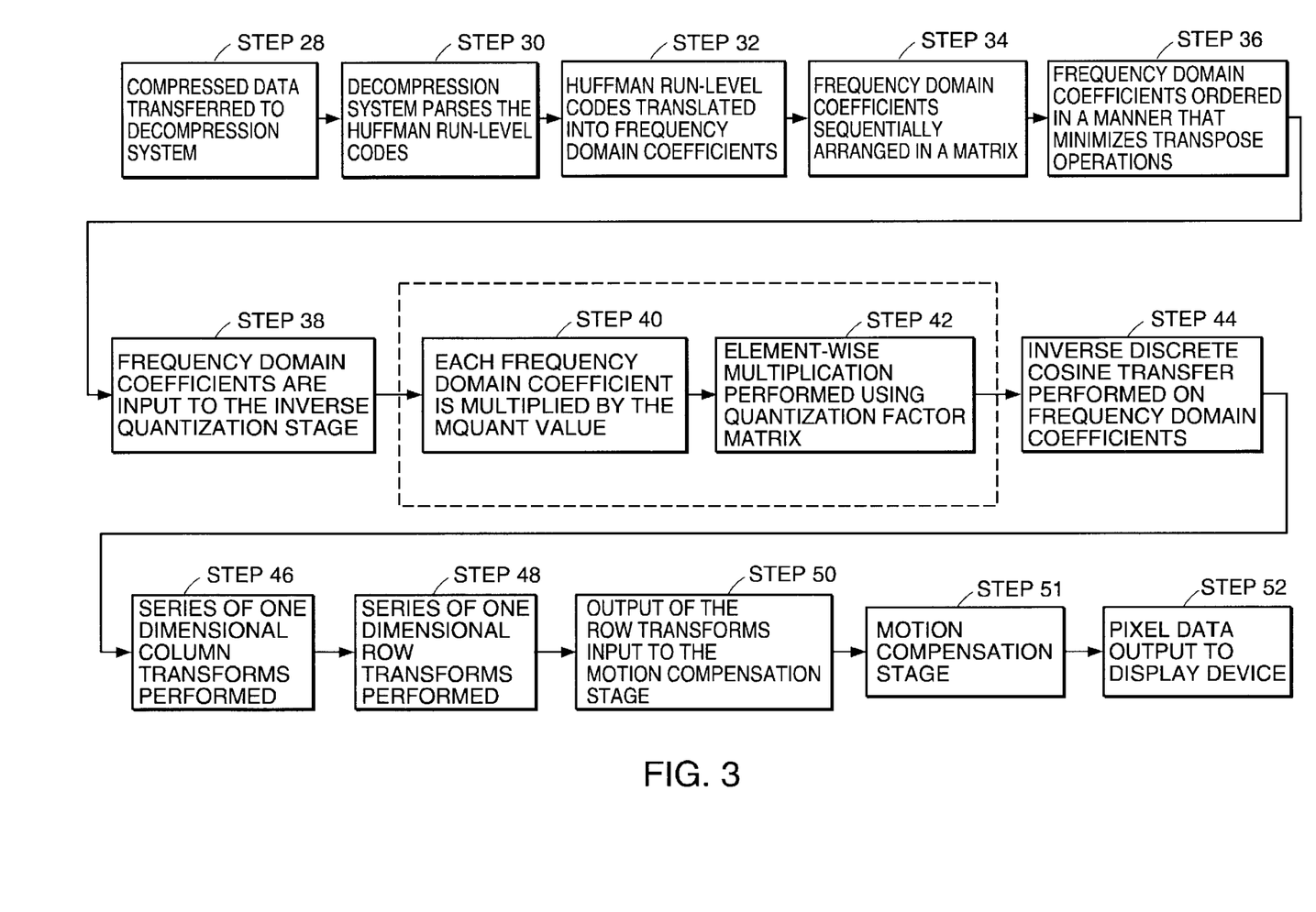
FIG. 3 illustrates a flow diagram of the operations performed in the decompression pipeline of FIG. 2.

Referring now to FIG. 3, a flow diagram more particularly depicts the operations performed by the above mentioned decompression pipeline 21 according to the present invention. Accordingly, the ordering of the coefficients in each stage of the decompression pipeline 21 will be shown with respect to FIG. 3.

The compressed data is transferred along the cable 12 (FIG. 1) in a serial fashion and input to the decompression system 16 (Step 28). The compressed file is comprised of variable length Huffman run level codes, which represent patterns of logical ones and zeroes. As described above, the Huffman run-level codes enable those patterns to be represented in a manner that occupies a significantly smaller amount of memory than the patterns otherwise would.

The Huffman run-level code translation stage 20 of the decompression system 16 parses the compressed data as it is received and sequentially identifies each Huffman run-level code contained therein (Step 30). Each Huffman run-level code is translated into a pattern of logical ones and zeroes that it represents (Step 32). Groups of those logical ones and zeroes, referred to as frequency domain coefficients, constitute a frequency domain representation of the video data that is generated by a discrete cosine transform operation when the data is compressed. The frequency domain coefficients are sequentially arranged in a matrix in the order in which they were translated from the Huffman run-level codes (Step 34). Those Huffman run-level codes are typically encoded in a zig-zag format to maximally find contiguous runs of zeroes. This zig-zag format further helps to compress the number of bits required to represent a picture.

For illustration purposes consider that the first sixteen frequency domain coefficients ($F_n$), that are translated from the Huffman run-level codes, (each comprised of eight bits of data) are arranged in a four-by-four frequency coefficient matrix, as shown below:

$$\begin{vmatrix} F1 & F2 & F3 & F4 \\ F5 & F6 & F7 & F8 \\ F9 & F10 & F11 & F12 \\ F13 & F14 & F15 & F16 \end{vmatrix}$$

It should be noted that although four-by-four matrices of frequency domain coefficients will be used for illustration purposes, the present invention is not limited to any specific matrix size. For example, eight-by-eight or thirty two-by-thirty two matrices can also be used with the present invention, as will be described below. One of ordinary skill in the art will be able to scale the illustration appropriately to facilitate any predetermined matrix size.

Each pair of frequency domain coefficients shown above are arranged or "packed" into a single longwood for input to the inverse quantization stage of the decompression pipeline 21. In the prior art, that packing is performed by storing each consecutive pair of coefficients into a single longwood as they are generated from the Huffman run-level codes. For example, the first and second frequency domain coefficients in a group of sixteen are stored in the same longwood. Likewise, the third and fourth frequency domain coefficients are stored together in a subsequent longwood. Each pair of frequency domain coefficients in the group is packed in this fashion.

Notwithstanding the prior art, an embodiment of the present invention orders each pair of coefficients in a manner that minimizes the number of transpose operations that are necessary during the decompression operation (Step 36).

When the coefficients are ordered, memory space is allocated for a matrix that has half as many columns and twice as many rows as the original matrix. Because the present illustration deals with a four-by-four matrix, memory space is allocated for an eight-by-two matrix. The first eight frequency domain coefficients are sequentially stored in the top half of that matrix begging with the memory locations that comprise the first column. When each column in the top half of the matrix is filled with the first eight frequency domain coefficients, the bottom half of the matrix begins to be sequentially filled. The resulting eight-by-two matrix that is input to the inverse quantization stage 22 of the decompression pipeline 21 (FIG. 2) is shown below:

$$\begin{vmatrix} C1 & C5 \\ C2 & C6 \\ C3 & C7 \\ C4 & C8 \\ C9 & C13 \\ C10 & C14 \\ C11 & C15 \\ C12 & C16 \end{vmatrix}$$

Regarding the instant embodiment of the present invention, only a single row/column transpose is required based upon the above mentioned coefficient ordering, as will be discussed in further detail below.

Inverse Quantization

The coefficients are input to the inverse quantization stage 22 of the decompression pipeline 21 (FIG. 2), one longwood at a time, beginning with the longwood containing the first ordered pair of coefficients (Step 38). As previously described, a quantization is performed during the compression operation. That quantization applies an element-wise division to each DCT frequency domain coefficient. The division operation filters high energy coefficients to levels which the human eye can differentiate. Accordingly, each frequency domain coefficient is divided by a fixed value located in a corresponding location of a quantization factor matrix. Those values are referred to as quantization factors. Subsequently, each frequency domain coefficient is further divided by a single value referred to as the MQUANT value. Alternatively, the quantization factors may be scaled by the MQUANT value prior to the element wise division so that only a single division is required per coefficient.

During the decompression operation, the above mentioned quantization operation is reversed. The reverse operation is referred to as the inverse quantization operation. During the inverse quantization stage 22 of the decompression pipeline 21 (FIG. 2), each frequency domain coefficient is first multiplied by the MQUANT value (Step 40). Also, an element-wise multiplication is performed between the frequency domain coefficients in the above mentioned matrix and the associated quantization factors in the quantization factor matrix (Step 42). Again, it is permissible to first scale all the quantization factors by the MQUANT scalar value prior to the element wise multiplication, as indicated by the box surrounding steps 40 and 42 in FIG. 3. After the inverse quantization operation is complete, the data is approximately restored to the state in which it existed before it was quantized. The data is only approximately restored because the quantization operation is a lossy operation and therefore some of the data is unrecoverable. The quantization operation is a lossy operation because precision is lost in restoring the values, i.e. going from the division to the multiplication operations.

Inverse Discrete Cosine Transform

Once the inverse quantization operation is complete, the resulting data is essentially the frequency domain coefficients that were generated by passing the original pixel data through the discrete cosine transform operation. In order for the coefficients to be viewed, they need to be transformed from the frequency domain back into the spacial domain, i.e. transformed into pixels having associated coordinates on the x and y axis of a display device. Therefore, an inverse discrete cosine transfer is performed on the frequency domain coefficients in the four-by-four matrix (Step 44).

As specified above, the inverse discrete cosine transform operation is performed through an implementation of the following formula:

$$f(u, v) = \frac{1}{4}\sum_{x=0}^{7}\sum_{y=0}^{7} C(u)C(v)F(u, v) \times \cos\left[\frac{(2x+1)\mu\pi}{16}\right]\cos\left[\frac{(2y+1)v\pi}{16}\right]$$

Because the two-dimensional inverse discrete cosine transfer is an orthogonal function with orthonormal basis vectors, it is typically performed as a series of one-dimensional row transforms followed by a series of one-dimensional column transforms. However, the present invention involves performing a series of one-dimensional column transforms (Step 46) followed by a series of one-dimensional row transforms (Step 48). The data output by the inverse quantization stage 22 (FIG. 2) has been packed in the order used by the column operations of the discrete cosine transfer operation. Therefore, the predetermined pairs of data are each packed into two longwood pairs in the following manner and input to the inverse discrete cosine transform row operation:

$$\begin{vmatrix} Q1 & Q5 & Q9 & Q13 \\ Q2 & Q6 & Q10 & Q14 \\ Q3 & Q7 & Q11 & Q15 \\ Q4 & Q8 & Q12 & Q16 \end{vmatrix}$$

It should be noted that because each of the elements typically includes sixteen bits of data, each row of the matrix represents two longwords. The coefficients are output from the inverse quantization stage 22 (FIG. 2) in the same order that the column transform operation requires. Therefore the individual coefficients do not need to be reordered but are simply packed into the two-longwood pairs.

Conversely, the column operation portion of the inverse discrete cosine transfer stage 24 (FIG. 2) requires a significantly different configuration of coefficients from that which is required for the row operation portion. Specifically, the rows and columns of the matrix used in the row operations need to be exchanged, or transposed. Typically the transpose operation is performed by copying the coefficients into general purpose registers and then reordering them. A single transpose operation is required to arrange the coefficients output from the column operations into the following order used by the row operations:

$$\begin{vmatrix} Q1 & Q2 & Q3 & Q4 \\ Q5 & Q6 & Q7 & Q8 \\ Q9 & Q10 & Q11 & Q12 \\ Q13 & Q14 & Q15 & Q16 \end{vmatrix}$$

When the inverse discrete transform operation is complete, the coefficients have been decompressed into error coefficients which are input to a motion compensation operation (Step 50). The resulting error coefficients ($E_n$) remain in the same order as the coefficients that were input to the row operation of the inverse discrete transform operation. Accordingly, unlike the prior art operations, the resulting pixel data will be ordered in raster order, i.e. the order in which the data will be displayed on the output device. Therefore the rows and columns of the matrix do not need to be transposed before the data is input to the next stage in the decompression pipeline 21, i.e., the motion compensation stage.

The motion compensation stage 26 (FIG. 2) (Step 51) adds the error coefficients to associated motion vectors, determined by a motion estimation operation. The motion estimation operation compares the value of each pixel in the matrix to the value of each surrounding pixel in a consecutive frame. Based on those values, the operation determines which direction the pixels are moving and then determines a local gradient, i.e. the direction of greatest change. The local gradient is represented as a vector ($m_{13}X$, $m_{13}Y$) that, when added to the pixel's position in the prior frame, gives the pixel's position in the current frame. That vector adding computation is referred to as the motion compensation, which is used to form the final pixel value which will be displayed (Step 52).

Figure 4:
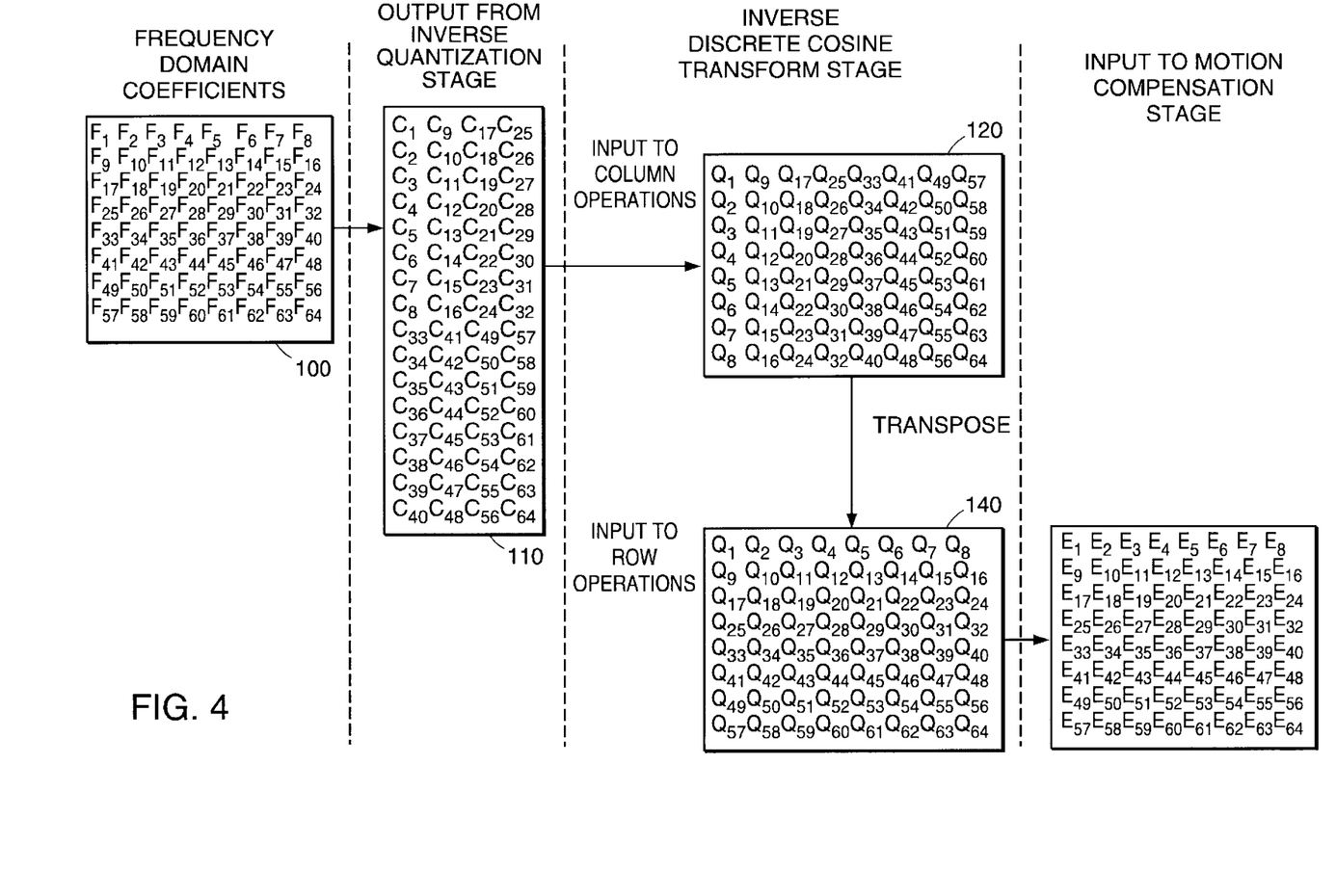
FIG. 4 depicts a flow diagram of the coefficient ordering during each stage of the decompression pipeline of FIG. 2.

Referring now to FIG. 4, a further embodiment of the invention depicts the coefficient ordering in the case of an eight-by-eight matrix. As depicted, the memory storage locations that comprise matrix 100 are filled with sixty four coefficients that have been translated from the Huffman run-level codes. The first coefficient is shown stored in the location that delineates the first location of the first row and the first column. The first row is sequentially filled with the second through the eighth coefficients. The remaining rows are sequentially filled in the same order.

The coefficients are re-ordered and input to the inverse quantization stage 22 (FIG. 2). When the coefficients are re-ordered, memory space is allocated for a matrix 110 that is half as wide and twice as long as the original matrix. In the present illustration, memory space is allocated for a sixteen-by-four matrix 110. The frequency domain coefficients are sequentially stored in the top half of that matrix 110 beginning with the memory locations that comprise the first column. When the top half of the matrix is filled with the first thirty two frequency domain coefficients, the bottom half of the matrix begins to be sequentially filled. After the inverse quantization operation is complete, the eight-by-eight matrix 120 that is input to the column operation portion of the inverse discrete cosine transform stage is formed by concatenating the corresponding rows from the top and bottom halves of the resulting matrix 110. After a single transpose operation, the matrix 140 is input to the row operation portion of the inverse discrete cosine transform stage.

It will be appreciated by those of skill in the art that the present invention further applies to compression of pixel data. Compression of pixel data involves the same steps described above, performed in the reverse order. Therefore, the ordering of coefficients described above works equally as well to reduce the number of transpose operations performed during a compression operation.

Decompression System

Figure 5:
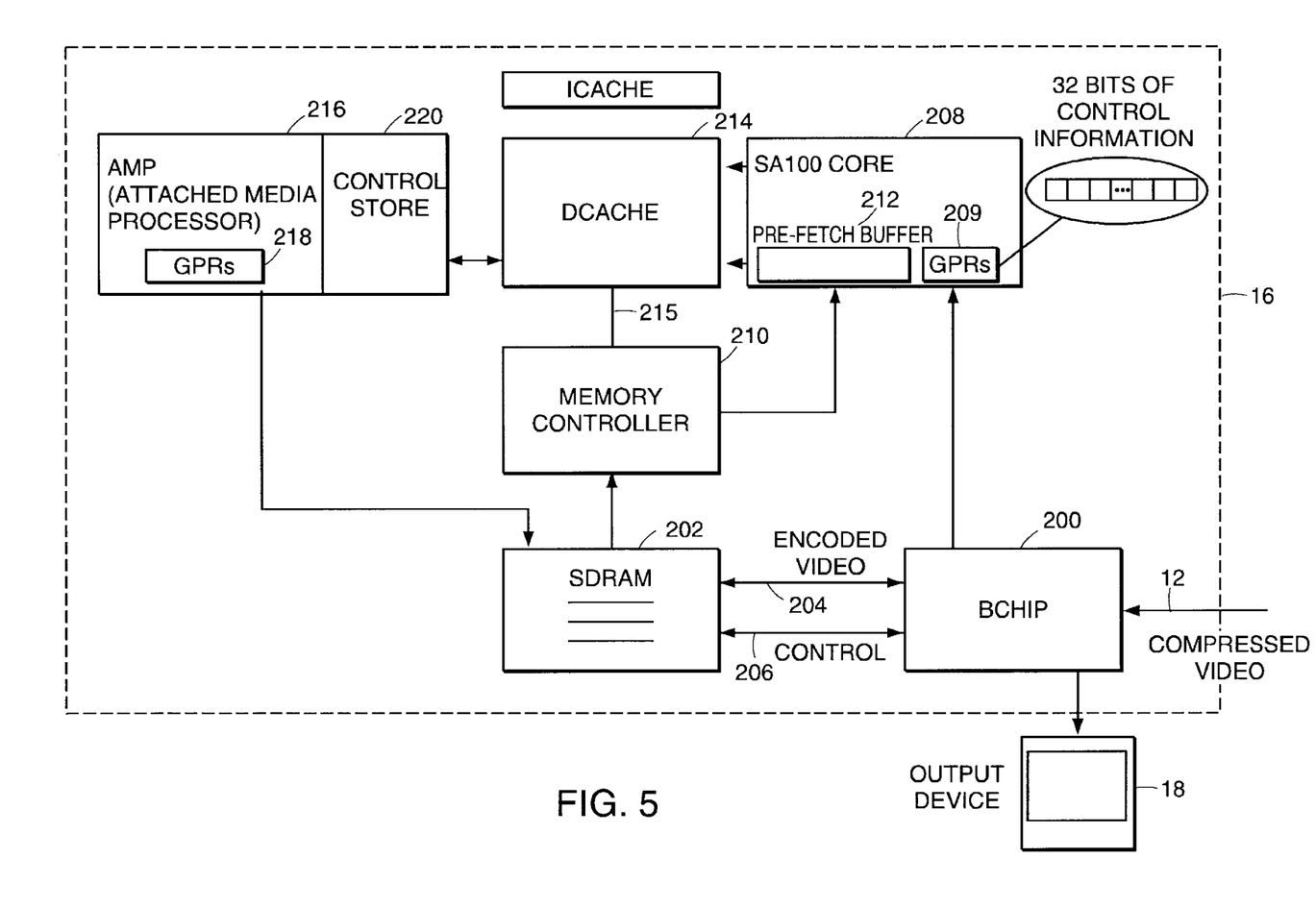
FIG. 5 is a block diagram of the decompression system of FIG. 1.
Figure 6:
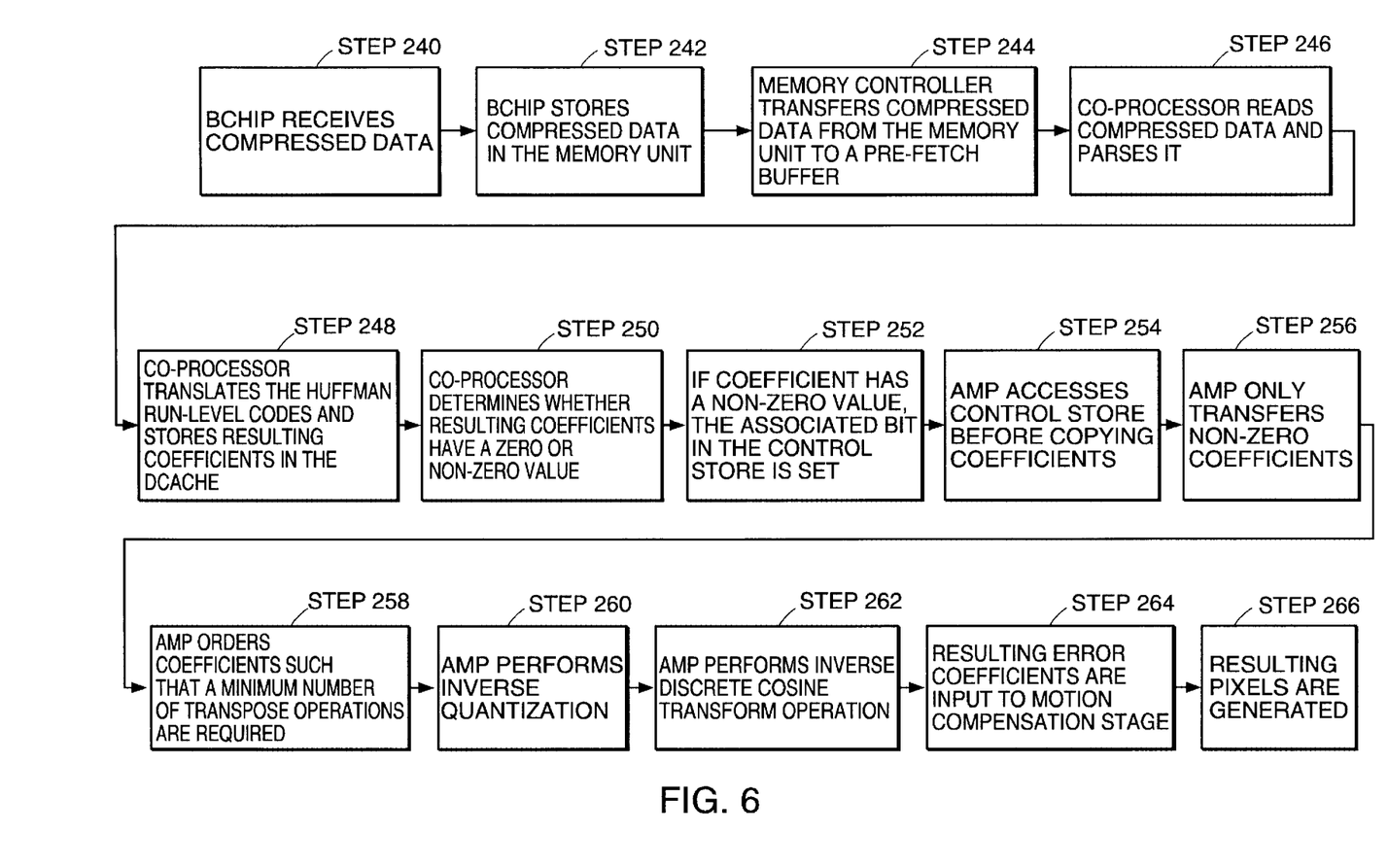
FIG. 6 is a flow diagram of the operation of the decompression system of FIG. 4 according to the present invention.

Referring now to FIGS. 5 and 6, the decompression system 16 which implements the decompression pipeline 21 described above is shown in more detail. The decompression system 16 includes logic for receiving compressed video data from the external cable 12. That logic is referred to as the bchip unit 200. The bchip unit 200 receives the compressed data as it is sent in a serial manner along cable 12 (Step 240). It stores those portions of the compressed data file in a memory unit 202 which is coupled to the bchip 200 by a data and address bus 204 and by a control bus 206 (Step 242).

A co-processor 208 is also coupled to the bchip and to a memory controller 210. The memory controller 210 is capable of transferring data between the memory unit 202 and the co-processor 208. Accordingly, when the co-processor 208 begins the decompression operation, it issues a signal to the memory controller 210. The memory controller 210 begins transferring the compressed data from the memory unit 202 to a pre-fetch buffer 212 contained in the co-processor 208 (Step 244). The co-processor 208 reads the compressed data from the pre-fetch buffer 212 and parses it (Step 246). The co-processor 208 identifies the Huffman run-level codes that comprise the compressed data and then translates them into the logical ones and zeroes that they represent (Step 248).

Each Huffman run-level code is translated by comparing that code with a table of values. That table provides the associated logical ones and zeroes that are represented by each Huffman run-level code. As co-processor 208 identifies and translates the Huffman run-level codes, it stores the resulting data in a Dcache 214. The Dcache 214 is coupled to the memory controller 210 via abus 215, for accessing the memory unit 202, and to an attached media processor (AMP) 216. Data is passed from the co-processor 208 to the AMP 216 via the Dcache 214. The data is stored in the Dcache 214 by the co-processor 208 and removed by the AMP 216 as it is required.

The AMP 216 performs the inverse quantization, inverse discrete cosine transform and motion compensation operations, described above. The AMP 216 includes a series of general purpose registers 218 and a control store 220. The general purpose registers 218 are temporary storage locations used during the operations performed by the AMP 216. For example, the data that the AMP 216 retrieves from the Dcache 214 is stored in the general purpose registers 218 until it is operated on. Also, the general purpose registers 218 are used by the AMP 216 for storing row and column data during transpose operations.

The control store 220 is a 32 bit register that can be read from and written to by the co-processor 208. It is used to store data that will be referred to as control information. Each bit in the control store 220 is associated with several coefficients that have been decoded from the Huffman run-level codes. In the present embodiment of the invention each bit in the control store 220 is associated with two coefficients.

The co-processor 208 generates the data that will eventually be stored in the control store 220. As previously mentioned, the co-processor 208 contains general purpose registers 209. Each time that the co-processor 208 begins using one of those general purpose registers 209, its value is cleared by logic associated with those registers. As the co-processor 208 converts each Huffman run-level code to frequency domain coefficients, it determines whether the coefficient has a zero or non-zero value (Step 250). If the coefficient has a non-zero value, the associated bit in the control store 220 is set (Step 252). Otherwise, nothing is stored in the associated bit, which therefore retains the initialized value, e.g. a logical zero.

In the present embodiment of the invention, each bit in the control store 220 will be associated with a pair of frequency domain coefficients. If either of the coefficients are non-zero the associated location in the general purpose register 209 will be set. For example, where the co-processor 208 generates a first and a second frequency domain coefficient from the Huffman run-level codes, a determination is made as to the value of each coefficient. If either coefficient is non-zero, the first storage location in the control store, i.e. the bit position corresponding to the first pair of coefficients, is set to a logical "1". Likewise, the co-processor 208 repeats the same steps for each successive pair of coefficients that are generated. Accordingly, an eight-by-eight matrix comprising sixty four coefficients will require thirty two associated storage locations in the general purpose register 209. When all sixty four frequency domain coefficients have been generated, the general purpose register 209 contains a map indicating which coefficients are non-zero.

The co-processor 208 stores the contents of the general purpose register 209, i.e. the control information, in the Dcache 214. Subsequently the AMP 216 copies the control information into the control store 220. Before the AMP 216 begins to copy the frequency domain coefficients that were stored in the Dcache 214 by the co-processor 208, it accesses the control store 220 (Step 254). Only the data associated with locations in the control store that are set, indicating that the data has a non-zero value, are copied from the Dcache 214 (Step 256). Data transfer efficiency between the Dcache 214 and the AMP 216 is improved because the AMP 216 will only copy non-zero coefficients from the Dcache 214. Using the information stored in the control store 220, the AMP 216 identifies the other coefficients as having a zero value and therefore does not initiate the time consuming task of copying zero valued data. Rather, since the general purpose register 218 is initialized to zero when it is first accessed, the locations that are associated with zero valued data are simply not written to. Only the locations associated with non-zero values are written to. Because many of the frequency domain coefficients are zero, the amount of data being copied from the Dcache 214 to the AMP 216 is greatly reduced, thereby improving the performance of the decompression system.

Because the AMP 216 copies the coefficients from the Dcache 214 into a general purpose register 218 in a serial manner (one at a time), it can easily copy each coefficient in any desired arrangement. Therefore, the AMP 216 can order the coefficients such that a minimum number of transpose operations are required as described above (Step 258).

For example, the coefficients in the four-by-four matrix are copied into the following pattern of general purpose registers (GPRs) 209:

$$\begin{vmatrix} Q1 & Q5 \\ Q2 & Q6 \\ Q3 & Q7 \\ Q4 & Q8 \\ Q9 & Q13 \\ Q10 & Q14 \\ Q11 & Q15 \\ Q12 & Q16 \end{vmatrix} \quad \begin{matrix} GPR\ \#0 \\ GPR\ \#1 \\ GPR\ \#2 \\ GPR\ \#3 \\ GPR\ \#4 \\ GPR\ \#5 \\ GPR\ \#6 \\ GPR\ \#7 \end{matrix}$$

When the AMP 216 determines that a coefficient is zero, via the control store 220, it does not write anything into that portion of the appropriate general purpose register longword since the GPR has been initialized to zero. Further, when the inverse discrete cosine transform is performed, the control store is checked to determine if any operand processing is required. If the control store is zero, then inverse discrete cosine transform steps which are known to result in zero values may be eliminated, thereby further reducing the operations required. Such a reduction is only possible if there is an operand map, such as described above.

The AMP 216 performs inverse quantization by multiplying each frequency domain coefficient with the associated quantization factor and by the MQUANT value (Step 260). The product of each multiplication is also stored in the general purpose registers 218. At this point, the frequency domain coefficients have been "approximately" restored to the values that were generated by the discrete cosine transform when the data was compressed.

When the inverse quantization operation has been completed, the AMP 216 begins the inverse discrete cosine transform operation (Step 262). As described previously, the typical manner of performing the inverse discrete cosine transform operation is to perform the row operations followed by the column operations. In order to minimize the number of transform operations that must be performed, the embodiment of the present invention performs the row transforms before the column transforms. The coefficients that were output from the inverse quantization operation are packed into the following arrangement of general purpose registers 218 for the column transform:

$$\begin{vmatrix} Q1 & Q5 & Q9 & Q13 \\ Q2 & Q6 & Q10 & Q14 \\ Q3 & Q7 & Q11 & Q15 \\ Q4 & Q8 & Q12 & Q16 \end{vmatrix}$$

After the column transform is performed on the above mentioned matrix, the resulting coefficient matrix is transposed. That transpose operation results in the following arrangement of general purpose registers 218 for the row transform:

$$\begin{vmatrix} Q1 & Q2 & Q3 & Q4 \\ Q5 & Q6 & Q7 & Q8 \\ Q9 & Q10 & Q11 & Q12 \\ Q13 & Q14 & Q15 & Q16 \end{vmatrix}$$

The result of the inverse discrete cosine transform operation is a series of error coefficients which are input to the motion compensation stage (Step 264). The motion compensation stage adds an error coefficient to an associated motion vector which has been previously generated by a motion estimation operation. The result is a series of pixels which can be displayed (Step 266).

The motion estimation operation, mentioned above, calculates the movement of pixels between consecutive frames of video data, otherwise known as calculation of the optical flow. Each pixel in a particular frame can be modeled as a moving object in the dimensions of sample time, horizontal space (the X-axis on a monitor display), and vertical space (the Y-axis on a monitor display). An optical flow calculation procedure, performed at consecutive discrete time instances or frames, provides information about the movement of a pixel between those frames. The method compares each pixel to its surrounding pixels, determines which direction they are moving with respect to time, and then determines a local gradient, i.e. the direction of greatest change of the pixel values. The local gradient is represented as a vector which, when added to the pixel's position in the prior frame, gives the pixel's position in the current frame. This motion vector is then used to compensate the final pixel values with respect to the reference picture's pixel values.

It should be noted that the order that the error coefficients are output from the inverse discrete cosine transform stage is consistent with the order required for motion compensation. Specifically, that order is raster order.

Accordingly, since the inverse discrete cosine transform row operations are completed after the column operations, only one transpose operation is used. The transpose operation that is normally required to place the pixels, output from the column operations, into raster order is not required. The only transpose that is used, modifies the order of the data output from the column operations into the order required by the row operations. Because the pixels output by the inverse discrete cosine transform stage are in raster order, no transpose operation is required after the row operations are completed. This results in a significant increase in performance.

Having described a preferred embodiment of the invention, it will now become apparent to one of ordinary skill in the art that other embodiments incorporating its concepts may be used. It is felt, therefore, that this embodiment should not be limited to the disclosed embodiment, but rather should be limited only by the spirit and scope of the appended claims.

What is claimed is:

1. A method for performing a decompression operation on a plurality of compressed image data elements, said method minimizing a number of transpose operations used during said decompression operation, said method comprising the steps of:

translating compressed video image data into an associated plurality of data elements, said translating step being one of a plurality of stages of said decompression operation;

storing sequential ones of said plurality of data elements in sequential locations of sequential columns of a first matrix, beginning with a first location in a first of said columns and ending with a last locations in a last of said columns;

performing an inverse quantization operation on said sequentially stored plurality of data elements for generating a plurality of coefficients; and arranging said plurality of coefficients, in a first pre-determined order such that only a single transpose operation is required during said decompression operation in a manner enabling video playback.

2. The method of claim 1, further comprising the steps of:

inputting said plurality of coefficients into a column transform operation portion of an inverse discrete cosine transform operation in a second pre-determined order, said second order associated with said first order, and performing said column transform operation portion before performing a corresponding row transform operation portion of said discrete cosine transform; and performing said row transform operation portion and outputting a plurality of error data therefrom, said error data output from said row transform portion in raster order.

3. The method of claim 2 wherein said step of arranging said plurality of coefficients in a first predetermined order, further comprises the steps of:

storing sequential ones of said plurality of coefficients in sequential locations of sequential columns of a top half of a second matrix until all said locations in said top half of said second matrix have said ones of said plurality of coefficients stored therein, said second matrix including twice a number of rows and half a number of columns as said first matrix; and storing remaining sequential ones of said plurality of coefficients in sequential locations of sequential columns of a bottom half of said second matrix.

4. The method of claim 3 wherein said step of inputting said plurality of coefficients into said column transform operation portion of said inverse discrete cosine transform operation further includes the step of:

alternatively transferring a row of said coefficients stored in said top half of said second matrix and a row of said coefficients stored in said bottom half of said second matrix to said column transform operation portion of said inverse discrete cosine operation until all of said coefficients stored in said second matrix have been transferred.

5. The method of claim 1 wherein said first matrix includes four rows and four columns and wherein said plurality of coefficients are stored in the following said predetermined order:

$$\begin{vmatrix} C1 & C5 \\ C2 & C6 \\ C3 & C7 \\ C4 & C8 \\ C9 & C13 \\ C10 & C14 \\ C11 & C15 \\ C12 & C16 \end{vmatrix}.$$

6. The method of claim 1 wherein said first matrix has eight rows and eight columns and wherein said plurality of coefficients are stored in the following said predetermined order:

$$\begin{vmatrix} C1 & C9 & C17 & C25 \\ C2 & C10 & C18 & C26 \\ C3 & C11 & C19 & C27 \\ C4 & C12 & C20 & C28 \\ C5 & C13 & C21 & C29 \\ C6 & C14 & C22 & C30 \\ C7 & C15 & C23 & C31 \\ C8 & C16 & C24 & C32 \\ C33 & C41 & C49 & C57 \\ C34 & C42 & C50 & C58 \\ C35 & C43 & C51 & C59 \\ C36 & C44 & C52 & C60 \\ C37 & C45 & C53 & C61 \\ C38 & C46 & C54 & C62 \\ C39 & C47 & C55 & C63 \\ C40 & C48 & C56 & C64 \end{vmatrix}$$

7. The method of claim 2 further including the steps of:

determining, prior to inputting said plurality of coefficients into said column transform operation portion of said inverse discrete cosine transform operation, which of said coefficients have a zero value; and reducing a number of operations performed during said inverse discrete cosine operation by performing portions of said column transform operation that result in non-zero data.

8. The method of claim 2 further including the steps of:

determining, prior to inputting said plurality of coefficients into said column transform operation portion of said inverse discrete cosine transform operation, which of said coefficients have a zero value; and reducing a number of operations performed during said inverse discrete cosine transform operation by performing portions of said row transform operation which result in non-zero data.

9. The method of claim 1, wherein said compressed video image data is MPEG compressed data.

10. The method of claim 1, wherein said compressed video image data is MPEG2 compressed data.

11. The method of claim 1 wherein said compressed video image data is MPEG4 compressed data.

12. The method of claim 1 wherein said compressed video image data is either IPEG or JPEG compressed data.

13. The apparatus of claim 1 wherein said compressed video image data is P×64 compressed data.

14. A computer system for performing a decompression operation on a compressed data comprising:

a first processor, for receiving compressed video image data and for translating said compressed video image data into logical data elements; and a second processor, for receiving said logical data elements and for performing an inverse quantization operation on said logical data elements, said inverse quantization operation generating a plurality of coefficients, wherein the second processor arranges the plurality of coefficients in a matrix in a first order such that only a single transpose operation is required during said decompression operation in a manner such that video playback is enabled, said first order arrangement of the plurality of coefficients minimizing a number of transpose operations used during said decompression operation.

15. The computer system of claim 14 wherein said second processor is for further performing a column transform operation portion of an inverse discrete cosine transform operation on said coefficients before performing a row transform operation portion of an inverse discrete cosine transform operation.

16. The computer system of claim 15 wherein said second processor arranges said coefficients in said first order by storing sequential ones of said coefficients in sequential locations of sequential columns of a top half of a matrix until all said locations are filled, and storing remaining sequential ones of said coefficients in sequential locations of sequential columns of a bottom half of said matrix.

17. The computer system of claim 15 wherein said second processor determines which of said coefficients have a zero value and responsively reduces a number of operations performed during said inverse discrete cosine operation by performing only those portions of said column transform operation that will result in non-zero data.

18. The computer system of claim 14 wherein said compressed video image data is MPEG compressed data.

19. The computer system of claim 14 wherein said compressed video image data is MPEG2 compressed data.

20. The computer system of claim 14 wherein said compressed video image data is MPEG4 compressed data.

21. The computer system of claim 14 wherein said compressed video image data is either IPEG or JPEG compressed data.

22. The computer system of claim 14 wherein said compressed video image data is P×64 compressed data.

23. The computer system of claim 14 wherein said matrix includes four rows and four columns and wherein said coefficients are stored in the following said first order:

$$\begin{vmatrix} C1 & C5 \\ C2 & C6 \\ C3 & C7 \\ C4 & C8 \\ C9 & C13 \\ C10 & C14 \\ C11 & C15 \\ C12 & C16 \end{vmatrix}.$$

24. The computer system of claim 14 wherein said matrix includes eight rows and eight columns and wherein said coefficients are stored in the following first order:

$$\begin{vmatrix} C1 & C9 & C17 & C25 \\ C2 & C10 & C18 & C26 \\ C3 & C11 & C19 & C27 \\ C4 & C12 & C20 & C28 \\ C5 & C13 & C21 & C29 \\ C6 & C14 & C22 & C30 \\ C7 & C15 & C23 & C31 \\ C8 & C16 & C24 & C32 \\ C33 & C41 & C49 & C57 \\ C34 & C42 & C50 & C58 \\ C35 & C43 & C51 & C59 \\ C36 & C44 & C52 & C60 \\ C37 & C45 & C53 & C61 \\ C38 & C46 & C54 & C62 \\ C39 & C47 & C55 & C63 \\ C40 & C48 & C56 & C64 \end{vmatrix}.$$

* * * * *